(No Model.)
J. A. PIMLOT.
HARROW FOR CULTIVATING LISTED CORN.
No. 375,379. Patented Dec. 27, 1887.
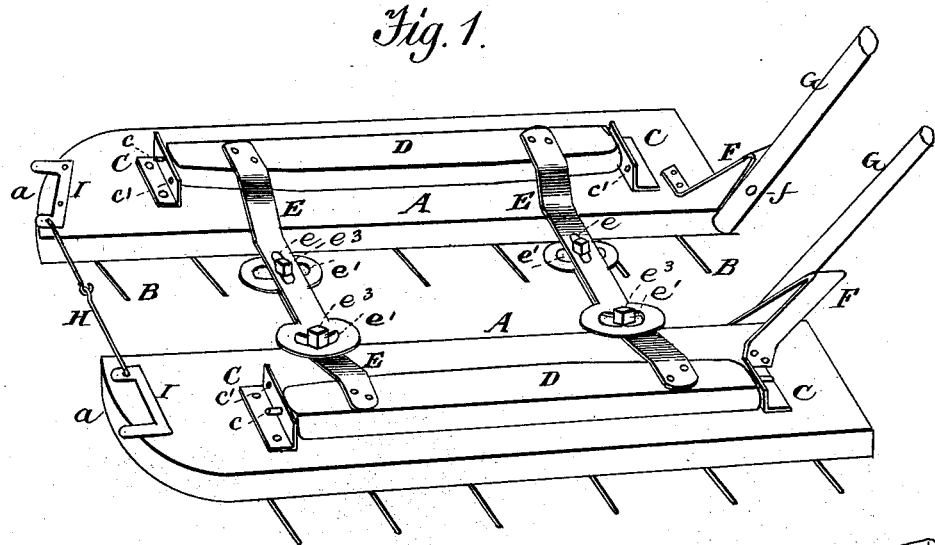
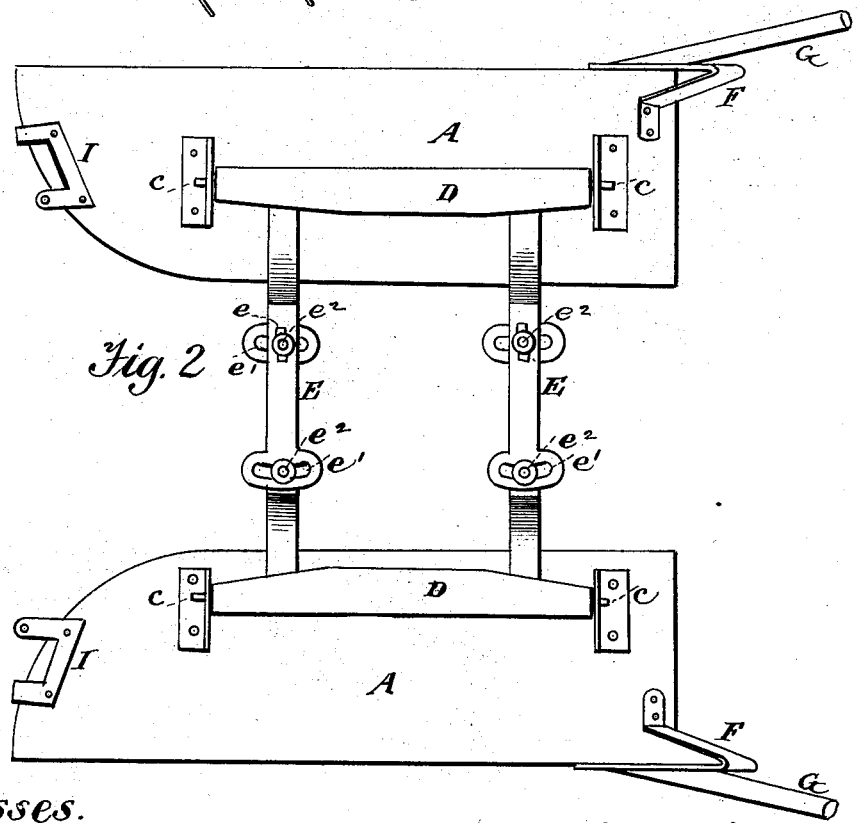
Witnesses.
A. Ruppert
D. P. Corl
Inventor,
Joseph A. Pimlot
Per
Thomas P. Simpson
Atty

UNITED STATES PATENT OFFICE.

JOSEPH ANDERSON PIMLOT, OF AUGUSTA, KANSAS.

HARROW FOR CULTIVATING LISTED CORN.

SPECIFICATION forming part of Letters Patent No. 375,379, dated December 27, 1887.

Application filed September 8, 1887. Serial No. 249,136. (No model.)

*To all whom it may concern:*

Be it known that I, JOSEPH ANDERSON PIMLOT, a citizen of the United States, residing at Augusta, in the county of Butler and State of Kansas, have invented certain new and useful Improvements in Harrows for Cultivating Listed-Corn Ground; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make of two reversible wings made adjustable in width a harrow adapted to be used as hereinafter described.

Figure 1 of the drawings is a perspective view of my invention in one position; Fig. 2, a plan view showing it in a reverse position.

In the drawings, A represents the wings, of the same size and similar form, each being correspondingly rounded in front and provided with the backwardly-inclined teeth B, bent to one side, and otherwise arranged so as to leave no ground uncut.

C are bearing-plates, in which are journaled the bars D, either at $c$ or $c'$. These plates are right-angled and made fast to the top of the wings A A. On the inside of the bars D are made fast the bent metallic straps E, which are longitudinally slotted at $e$ and cross-slotted at $e'$ to receive the clamping-screws $e^2$ and their nuts $e^3$. By this means the wings may be adjusted longitudinally or transversely with respect to each other, while either one of the wings may be turned up laterally to clear it of trash or obstructions.

F F are brackets fastened to the wings, to which are fulcrumed at $f$ the handles G G, with which to turn the wings. The fronts of the two wings are connected by hook-rods H and eye-plates I, and from these rods may pass the draft devices. Thus it will be perceived that the harrow may be narrowed or widened at each end; also, that the handles and their braces may be changed so as to come together at the rear when the operator walks behind the cultivator or harrow; or the handles may be thrown forward and the braces made to support them when the operator rides.

When cultivating small corn, the rounded corners $a\ a$ are brought together, as shown in Fig. 1 of the drawings, and when used to level down the ridges of the listed land, as shown in Fig. 2 of the drawings.

My harrow or cultivator is especially designed for use in land where corn has been planted in listed furrows, and it works in the furrows so as to cover small weeds and cultivate the furrow sides, adjusting itself by its flexibility to inequalities of surface.

The wings A A may be changed from their relative position to each other shown in Fig. 1 to that shown in Fig. 2 of the drawings by simply turning each outwardly a half-revolution on the bar D and then turning over the whole harrow, and may be turned from the position shown in Fig. 2 to that shown in Fig. 1 by reversing the operation.

One of the plates C may be detachably screwed or otherwise removably fastened, so that the journals of bar D may be placed in either of the holes $c\ c'$, according to the distance apart at which they are to be located. When the corn is small, the team is attached to the extended links or rods, but when large a horse is hitched to each wing.

A seat may be placed between the adjustable arches or straps and on the wings, or a standing-platform may be used. Hence it will be seen that the driver may walk, stand, or sit. Only one horse is required when the cultivator is used immediately after listing and before the corn comes up. The handles are mainly employed to free the harrow from grass, weeds, and trash. Under practical trial the invention is found to leave the ground free of clods and the rows nicely ridged. The incline of the teeth enables them to pass over trash without dragging it up into bunches. When cultivating in the furrow, the handles will be on the outside; but in leveling down the ridges, on the inside.

Ths handle-braces may be easily changed by loosening bolts and moving them from one wing to the other, so as to bring the handles to the right and left of the riding operator.

What I claim as new, and desire to protect by Letters Patent, is—

1. A harrow or cultivator formed of two similar wings carrying connected bars D D, journaled in bearings on their backs, whereby said wings may be changed in position, as described.

2. The combination, with bars D D on the backs of two harrow-wings, of the connecting-straps E E, slotted longitudinally and transversely to admit of adjustments by screws and nuts, as described.

In testimony whereof I affix my signature in presence of two witnesses.

JOSEPH ANDERSON PIMLOT.

Witnesses:
A. B. C. KNOX,
CARY D. PIMLOT.